United States Patent
Ripp et al.

(10) Patent No.: US 8,005,189 B2
(45) Date of Patent: Aug. 23, 2011

(54) SUITCASE COMPARTMENTALIZED FOR SECURITY INSPECTION AND SYSTEM

(75) Inventors: Thomas Ripp, Amherst, NH (US); Michael Lanzaro, North Reading, MA (US)

(73) Assignee: L-3 Communications Security and Detection Systems Inc., Woburn, MA (US)

(*) Notice: Subject to any disclaimer, the term of this patent is extended or adjusted under 35 U.S.C. 154(b) by 103 days.

(21) Appl. No.: 12/399,832

(22) Filed: Mar. 6, 2009

(65) Prior Publication Data
US 2009/0238335 A1      Sep. 24, 2009

Related U.S. Application Data

(60) Provisional application No. 61/034,221, filed on Mar. 6, 2008.

(51) Int. Cl.
   *G01N 23/04*      (2006.01)
   *A45C 3/00*       (2006.01)
   *A45C 13/04*      (2006.01)
   *A45C 13/42*      (2006.01)

(52) U.S. Cl. .......... 378/57; 378/208; 378/210; 190/102; 190/109; 190/122

(58) Field of Classification Search ............ 378/57, 378/62, 63, 51, 53, 208, 210; 190/100, 102, 190/106, 107, 109–111, 115, 122, 123, 124, 190/900–903
See application file for complete search history.

(56) References Cited

U.S. PATENT DOCUMENTS

| | | | | | |
|---|---|---|---|---|---|
| 1,975,294 | A | * | 10/1934 | Sand et al. | 206/289 |
| 2,131,583 | A | * | 9/1938 | Crotty et al. | 211/99 |
| 3,870,132 | A | * | 3/1975 | Hanley | 190/109 |
| 5,207,303 | A | * | 5/1993 | Oswalt et al. | 190/108 |
| 5,265,719 | A | * | 11/1993 | Wand | 206/223 |
| 6,000,509 | A | * | 12/1999 | Chisholm | 190/109 |
| 6,491,074 | B1 | * | 12/2002 | Roegner | 150/112 |
| 6,637,563 | B1 | * | 10/2003 | Ruckh | 190/108 |
| 6,910,560 | B2 | * | 6/2005 | Dulin | 190/109 |
| 6,970,088 | B2 | * | 11/2005 | Kovach | 340/572.1 |
| 6,994,131 | B2 | * | 2/2006 | Dedmon | 150/106 |
| 7,004,481 | B1 | * | 2/2006 | Stanish | 280/37 |

(Continued)

OTHER PUBLICATIONS

International Search Report, dated Jul. 28, 2009, from corresponding International Application No. PCT/US09/01443.

*Primary Examiner* — Anastasia Midkiff
(74) *Attorney, Agent, or Firm* — Wolf, Greenfield & Sacks, P.C.

(57) ABSTRACT

A piece of luggage, such as a suitcase, is constructed with one or more compartments of predesigned location and purpose to facilitate security inspection. Compartments may be designated to hold objects that, if obscured by other objects, carry an undesirably high likelihood of generating a false alarm because obscuring objects prevent an accurate assessment of the nature of those objects. For this reason, a compartment may be designated for liquids, gels and/or aerosols. A compartment may also be designated for objects, such as metal objects, which carry a risk of generating a false alarm if packed in a suitcase in a way that they obscure other objects and prevent an accurate determination of whether those objects are threat objects. Such compartments are positioned to ensure that the items they contain are segregated during x-ray inspection so as to neither obscure or be obscured by other objects packed in the luggage.

21 Claims, 6 Drawing Sheets

U.S. PATENT DOCUMENTS

| | | | |
|---|---|---|---|
| 7,161,097 B1* | 1/2007 | Gorgone | 177/126 |
| 7,207,154 B2* | 4/2007 | Araujo | 53/410 |
| 7,613,316 B2* | 11/2009 | Mahdavieh | 382/100 |
| 2002/0073646 A1* | 6/2002 | Von Gutfeld et al. | 53/54 |
| 2002/0153216 A1* | 10/2002 | Krulik | 190/103 |
| 2005/0016808 A1* | 1/2005 | Sapyta | 190/107 |
| 2005/0041781 A1* | 2/2005 | Jefferson | 378/210 |
| 2005/0051586 A1* | 3/2005 | Siwak et al. | 224/576 |
| 2005/0217904 A1* | 10/2005 | Hughes | 177/245 |
| 2006/0140341 A1 | 6/2006 | Carver et al. | |
| 2006/0207850 A1* | 9/2006 | Lewis | 190/115 |
| 2007/0003009 A1 | 1/2007 | Gray | |
| 2007/0107947 A1* | 5/2007 | Truong | 177/131 |
| 2007/0297560 A1* | 12/2007 | Song et al. | 378/4 |
| 2008/0110711 A1* | 5/2008 | Coughlin | 190/9 |

* cited by examiner

SUITCASE COMPARTMENTALIZED FOR SECURITY INSPECTION AND SYSTEM

RELATED APPLICATIONS

This application claims priority under 35 U.S.C. §119(e) to U.S. Provisional Application Ser. No. 61/034,221, entitled "SUITCASE COMPARTMENTALIZED FOR SECURITY INSPECTION AND SYSTEM," filed on Mar. 6, 2008, which is incorporated herein by reference in its entirety.

BACKGROUND

1. Filed of Invention

This invention relates generally to security inspection systems and more specifically to increasing the efficiency or effectiveness of a security inspection system.

2. Description of Related Art

Security inspection systems have come into widespread use. Luggage, whether carry-on or checked, is generally inspected before it is allowed onto an airplane to detect explosives, weapons or other contraband items. Security inspection may also be employed in other settings, such as at entrances to government buildings or at sporting events or other venues where crowds of people are expected to gather. In these and other settings were security inspection systems are used, a large number of people, and their luggage, often need to be inspected in a short period of time.

Techniques have been developed to accurately and quickly inspect luggage so as to provide minimal disruption to the people who may be delayed while the inspection is being performed. Such techniques may involve inspection equipment that uses any of a number of technologies to form an image of objects within a piece of luggage. X-ray radiation is frequently used to form an image of objects within a piece of the luggage. This image may then be analyzed to identify objects and characteristics of those objects, such as shape, density or atomic number. The nature of objects in the luggage may be inferred from these characteristics, allowing an assessment of the likelihood that the luggage contains a threat object.

In some instances, the image is presented to a human user to make that assessment. Though, fully automated and machine-assisted inspection systems are also used in which a computer processes the image to make a threat assessment.

Regardless of how the assessment is made, ensuring safety mandates that a piece of luggage under inspection cannot be cleared if no determination can be made to a high degree of certainty that the item is free of explosives of other threat items. Rather, the item must be "alarmed," even though it is not certain that the item contains a threat object. Alarmed items may be rerouted for a more careful inspection using other techniques or possibly directed to a human operator for a manual search of the item under inspection. Regardless of how alarmed items are processed, that processing is likely to slow the inspection process, delaying passengers and consuming resources. More often than not, as a result of a higher level of inspection, a determination may be made that the alarmed item does not, in fact, contain any threat item and can subsequently be cleared.

SUMMARY

To improve the overall security inspection process, an item of luggage may be configured with compartments to receive different types of materials. Items that tend to prevent a piece of luggage from being cleared during an initial inspection may be segregated in these compartments, improving the efficiency of the inspection process.

For example, a compartment may be provided for metal objects. A separate compartment may be provided for items containing liquids, gels and aerosols. A further compartment may be provided for a laptop computer or other portable electronic devices.

An inspection system may take advantage of configuration information about the item of luggage in performing an automated or semi-automated inspection of the item. The system can apply differentiated processing to different compartments based on the types of materials expected to be present in those compartments, which can increase speed and/or accuracy of inspection.

Accordingly, in one aspect, the invention relates to a method of facilitating security screening for luggage. The method involves selectively packing items in a piece of luggage comprising a plurality of compartments. Metal items may be packed in a first of the plurality of compartments. Items containing liquids or gels may be packed in a second of the plurality of compartments. The selectively packed piece of luggage is then presented for x-ray inspection.

In another aspect, the invention relates to luggage adapted for security inspection. The luggage has an outer casing enclosing an inner region adapted for holding a plurality of objects. Dividers within the inner region are positioned to define a plurality of compartments hidden from view by the casing. A first of these compartments is designated to contain metal objects and a second compartment is designated to contain liquids and/or gels.

In yet another aspect, the invention relates to a system for inspecting luggage. The system includes an imaging unit adapted to produce an image of the contents of a piece of luggage under inspection. The system includes a processor and computer storage medium storing computer executable instructions that control the processor to acquire an image of the piece of luggage under inspection and determine whether the piece of luggage under inspection has at least one compartment adapted to hold items of a predefined type. The image is selectively analyzed such that when the piece of luggage under inspection is not determined to have the at least one compartment, the image is analyzed in accordance with a first algorithm. When the piece of luggage under inspection is determined to have the at least one compartment, the image is analyzed in accordance with a second algorithm, different than the first algorithm.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that the efficiency and/or effectiveness of security inspection may be improved by providing luggage with compartments to segregate certain types of objects during inspection. These compartments may be designated to hold materials for which there is an increased risk of generating a false alarm if objects made of that material are obscured by or obscure other objects during inspection. These compartments may be positioned to lower the likelihood that other objects will be packed in the luggage in a location that will be in the path of x-rays through the compartments during an x-ray inspection. As a result, characteristics, such as shape, density or atomic number, of objects in those compartments can more accurately be ascertained. More accurate measurements increase the confidence in an assessment that an item under inspection does not contain a threat object, reducing the need to alarm items.

In some embodiments, segregating objects of certain types may improve the accuracy of a conventional threat assessment algorithm. Though, in other embodiments, an inspection system may take advantage of information indicating that an item under inspection has compartments in a predefined configuration to alter its analysis of an image of the item to tailor analysis of regions of the item based on the types of objects that are expected to be in those regions.

In the following description, a suitcase to be packed by a passenger preparing to travel on an airplane is used as a specific example, but any suitable piece of luggage may be configured as described below.

More specifically, by defining the specific construction, layout, and intended compartmentalization of the various types of items that may be stored in the bag, threat detection algorithms can be tailored to offer enhanced performance (higher detection rates and lower false alarms). Specifics of the implementation include, but are not limited to, the following:

The suitcase/bag is populated with specific objects of defined size, shape, and/or material composition such that the detection algorithm uses their placement within the base as a means for improving detection performance and false alarm rates. These specific objects are chosen based on their density and/or effective atomic number (might be foam insert within the bag, compartment walls, etc.). Performance is improved because the algorithms are able to "net out" the effects of the surrounding material by accounting for the effect they have on the x-ray data that is read by the detectors.

There may be a section within the bag that is an area targeted for liquids, gels and/or aerosols to be placed. It is also possible that specific bottles/containers are used wherein the specific properties (such as effective atomic number and density) are known to the detection algorithm. Given the exact information on the container, the x-ray system could do a better job of determining what "type of liquid/gel" is contained.

The bag may also include a section that is intended to be populated with any metallic objects, knowing that metals can often act as shielding in x-ray based systems.

The bag may also include a section that is designated to hold a laptop or other portable electronic device.

The foregoing examples of specific compartments are representative of the types and possible uses of compartments within a suitcase or other similar container. A suitcase may include some or all of the above described type compartments and other types of compartments instead of or in addition to the specific types described above.

Any suitable materials may be used to form a container according to embodiments of the invention. The external surface of a suitcase or bag with compartments to facilitate inspection can be entirely or partially transparent to visible light to facilitate visual inspection of the contents of the compartments. However, the bag may be configured for inspection using penetrating radiation and it is not a requirement of the invention that the bag be constructed to facilitate visual inspection. In some embodiments, materials such as leather, cloth, nylon, plastics or other synthetic materials may be used to form exterior surfaces of the suitcase or bag, which may provide an exterior surface that is totally or substantially visibly opaque.

Within the suitcase, the compartments also may be formed of dividers, bags, pouches or other structures that are visibly opaque, but transparent to X-ray radiation, to help preserve the suitcase owner's privacy in the event that opening the suitcase to inspect one or a limited number of compartments is warranted. Though, in some embodiments, dividers, bags, pouches or other structures that form compartments may be visibly transparent to provide easy visual inspection for an operator of the X-ray scanning machine or any other security personnel. In other embodiments, compartments may be formed with dividers that do not create fully enclosed areas, which may facilitate both visual inspection and packing or unpacking of the suitcase. Though, in some embodiments, the dividers or other structures that create compartments may be radio-opaque so that they appear in x-ray images of the item.

In other aspects, the invention may relate to a security inspection system configured for operation in connection with a compartmentalized bag as described above. The compartments may have a government approved (such as by the Transportation Security Administration—TSA—in the US) format and would facilitate automated inspection of the suitcase. Travelers authorized to use the suitcase could pack ordinary travel items in designated compartments, which could increase the effectiveness with which an automated inspection algorithm applied to an x-ray image of the suitcase could detect out-of-the-ordinary items that potentially represent explosives or other contraband. In this scenario, a pre-certified traveler may present some indication of his or her status at the time the suitcase is presented for inspection.

An inspection system for use with compartmentalized suitcases may be constructed using technology as known in the art and may include components such as an X-ray source or sources, an X-ray detector or detectors positioned to receive radiation from the X-ray source after it has interacted with an item under inspection, a conveyor to move items under inspection through the system, and one or more computers to process data collected with the detectors.

The data collected using X-ray inspection may represent a projection image or a volumetric image of all or a portion of the item under inspection. Regardless of the form of the image, it may be analyzed to detect suspicious regions of the item under inspection. Each suspicious region may represent a region for which the image data reveals an unacceptably high likelihood that a weapon, explosive or other contraband is present. Alternatively, a suspicious region may represent a region for which analysis could not conclude that there is a sufficiently high likelihood that the region is free of weapons, explosives or other contraband.

The detectors may be positioned to collect X-rays that have interacted with an item under inspection in any way that reveals information about the item under inspection. In many known systems, the intensity of x-rays that have passed through an item under inspection is measured and used as an indication of the density of specific regions of the item. Alternatively or additionally, radiation that has interacted with an item under inspection in other ways may be detected. For example, backscatter radiation or forward scattered radiation may be detected and analyzed to obtain information about objects within the item under inspection. Parameters of scattered radiation, such as its intensity or scattering angle, may be measured. As a further example, a spectrum of radiation passing through an item may be analyzed to obtain an indication of the atomic number of material within the item based on relative attenuation of high energy x-rays and low energy x-rays. Techniques to analyze luggage using these measurements are known in the art and such conventional techniques may be used, either modified or unmodified.

Regions may be two dimensional, represented as pixels in an image of the item under inspection, or may be three dimensional, represented as voxels in an image of the item under inspection. Data about each region may be collected in any suitable way. As one example, computed tomography or multi-view inspection techniques may be used to form voxels. As another example, a line scanner may be used to form pixels in a projection image.

The inspection system may optionally employ one or more other inspection technologies. These technologies may be employed instead of or in addition to X-ray inspection technologies, and more than one inspection X-ray inspection technology may be used in the same system. Each technology may be used to collect data on the full item under inspection or may be used to obtain information about a smaller portion of the item under inspection. For example, nuclear quadrupole resonance or thermo neutron analysis may be used. As another example, x-ray diffraction techniques, which can be focused to collect data about a specific region of the item under inspection, may be used.

Regardless of the specific techniques used, each technique may provide information about objects within the item under inspection. Material properties—such as density or atomic number—object properties—such as mass, volume or shape—or relationships of objects—such as proximity, interconnection, or aggregate mass—may be ascertained through the use of an inspection technique.

The information obtained using these techniques may be analyzed using any suitable technique, whether now known or hereafter developed, to ascertain whether the item under inspection can be cleared or, conversely, whether the item should be alarmed because it contains a suspicious region that could represent a contraband item. The analysis techniques may be automated, manual or partially automated and partially manual. For manual analysis, an image or other representation of the item under inspection may be presented on a computer terminal or similar display for a human operator to observe. Automated analysis may entail processing within a computer.

Handling of cleared and alarmed items may be performed according to techniques known in the art. For example, cleared items may be passed for loading onto an aircraft or another vessel. Alarmed items may be diverted for further inspection or other appropriate action to respond to the possibility of contraband being present.

Criteria to judge which items should be cleared or alarmed may also be established as is known in the art. However, the specific inspection and analysis techniques, and specific criteria used to delineate cleared from alarmed items, may be either selected or adapted to take advantage of information provided from creating predefined compartments that are expected to contain objects with predefined properties. Thus, in some embodiments, an inspection system may be configured to employ different inspection technologies and may include a mechanism to selectively apply those inspection technologies at different locations of the item under inspection to gather different types of data for different compartments. Alternatively or additionally, in some embodiments, an inspection system may be programmed to implement multiple analysis algorithms and may contain a mechanism to selectively apply those analysis algorithms to data based on the type of compartment from which the data was collected.

For example, compartments expected to contain clothes or other relatively low density objects may be imaged with a technique that only forms a single energy projection image. Compartments expected to contain metal may be analyzed with multi-view inspection techniques or using a CT scan, which are less susceptible to the shielding effects of metal than an inspection technique that forms a projection image. A compartment expected to contain gels or other materials that have densities similar to densities of explosives may be imaged using a dual energy x-ray technique or other technique that gathers atomic number information or other information useful in differentiating between an innocuous gel and an explosive.

The analysis algorithms used by the inspection system may also be different, depending on compartment. For a compartment that is expected to contain only relatively low density objects, an analysis algorithm may alarm a bag if it detects high density objects in that compartment. In contrast, in a compartment expected to contain high density objects, an analysis algorithm may be applied to distinguish between contraband and innocuous objects by analyzing the shape, size or relative position of objects before determining whether the item should be alarmed.

The inspection technologies and analysis techniques to be applied to each compartment may be determined in advance of inspection or may be determined adaptively during inspection. For example, a first inspection phase may operate on data gathered using a relatively fast inspection technique, such as a technique that forms a projection image of the entire suitcase or a technique that forms a "helical scan" of the suitcase as the suitcase is moving on a conveyor through the inspection system. The first phase analysis may be performed on data for the entire item gathered using these techniques. As a result of the first phase, compartments containing objects that are other than as expected may be identified. Results of the first phase analysis may be used to select inspection techniques to gather further data or analysis techniques applied in a second phase to the compartments containing objects other than as expected. The selected inspection technologies or analysis techniques may more specifically determine whether the deviations identified in the first phase indicate contraband items. The second phase inspection could be performed by moving the item under inspection to a different location, by collecting additional data on the item under inspection, by re-analyzing data collected during the first phase, or in any other suitable way.

For an inspection system to take action based on compartments, the inspection system may be provided with information about the compartments of each suitcase it is to inspect. Such information may be provided to the inspection system in any suitable way. As one example, each suitcase to be inspected by a machine may have a predetermined compartmentalized configuration. Each suitcase may be loaded into the inspection system with a predetermined orientation. As a result, the inspection system can map locations being inspected to specific compartments within the suitcase and the inspection system may be programmed to identify different compartments for different treatment during inspection.

In other embodiments, an inspection machine may be configured to perform differentiated inspection on suitcases, containers or other items of luggage having one of a number of predetermined configurations. For each bag inspected, the inspection system may be dynamically provided with information on the specific configuration to be use. Information identifying a type of bag may be provided in any suitable way. For example, a bag type could be input manually by an operator. Alternatively, each suitcase could include a tag in any suitable form that is capable of being used to convey information to the inspection system. A tag could employ near field communication (NFC) techniques, such as RFID, to communication a bag configuration to an inspection system equipped with an NFC receiver. As another example, a bar code applied to the exterior of the suitcase could be used to communicate information to a system equipped with a bar code reader. As a further alternative, the tag could be constructed from a pattern of radio-opaque material that distinctly appears in an image of the suitcase. Such a pattern, for example, could be formed from wire-like objects. The objects could be arranged in a pattern representing a code identifying a configuration of the suitcase. Alternatively, the radio-opaque materials could be positioned within the suitcase to delineate compartments, which could be recognized by analysis software within the inspection system operating on an x-ray image of the suitcase.

In some embodiments, one or more mechanisms may be incorporated into the inspection system to determine the orientation of a suitcase without requiring precise positioning on a belt carrying the item. One such mechanism may be objects that appear in an image of the item and may act as fiducial marks. Though, as a possible alternative, mechanisms for collecting visual data may be used in conjunction with shape information about suitcases or identifiers included on the suitcases to identify the configuration of compartments within the item.

As yet a further alternative, a compartmentalized item could contain mechanisms to both delineate compartments and identify their intended contents. In these embodiments, it may not be necessary for an item under inspection to have a predetermined configuration. For example, some or all of the structure defining boundaries between compartments could be radio-opaque, such that the compartments would appear in an image of the item. For example, wires or wire-like objects could be embedded in separators between compartments. Compartments for different types of materials could have different and recognizable shapes. Alternatively, radio-opaque tags identifying the intended use of each compartment could also be inserted within each compartment and may appear in an x-ray image of the item, allowing an inspection system to identify both the location and intended contents of each compartment by analysis of x-ray images.

Accordingly, the specific mechanism to identify the configuration, orientation and intended use of the compartments within an item under inspection are not critical to the invention.

In an embodiment in which compartmentalized suitcases are intended to increase the confidence with which inspected items can be cleared, allowing faster and/or more automated security screening of some trusted travelers, the inspection system may be programmed to alarm an item for which the system cannot determine a configuration of compartments.

As an alternative, if a system cannot determine a configuration and orientation of compartments, it may apply inspection and analysis techniques to the item as a whole, rather than on a compartment-by-compartment basis. Thus, a system may perform differentiated processing based on compartments and based on whether it can identify compartments.

Figure 1:
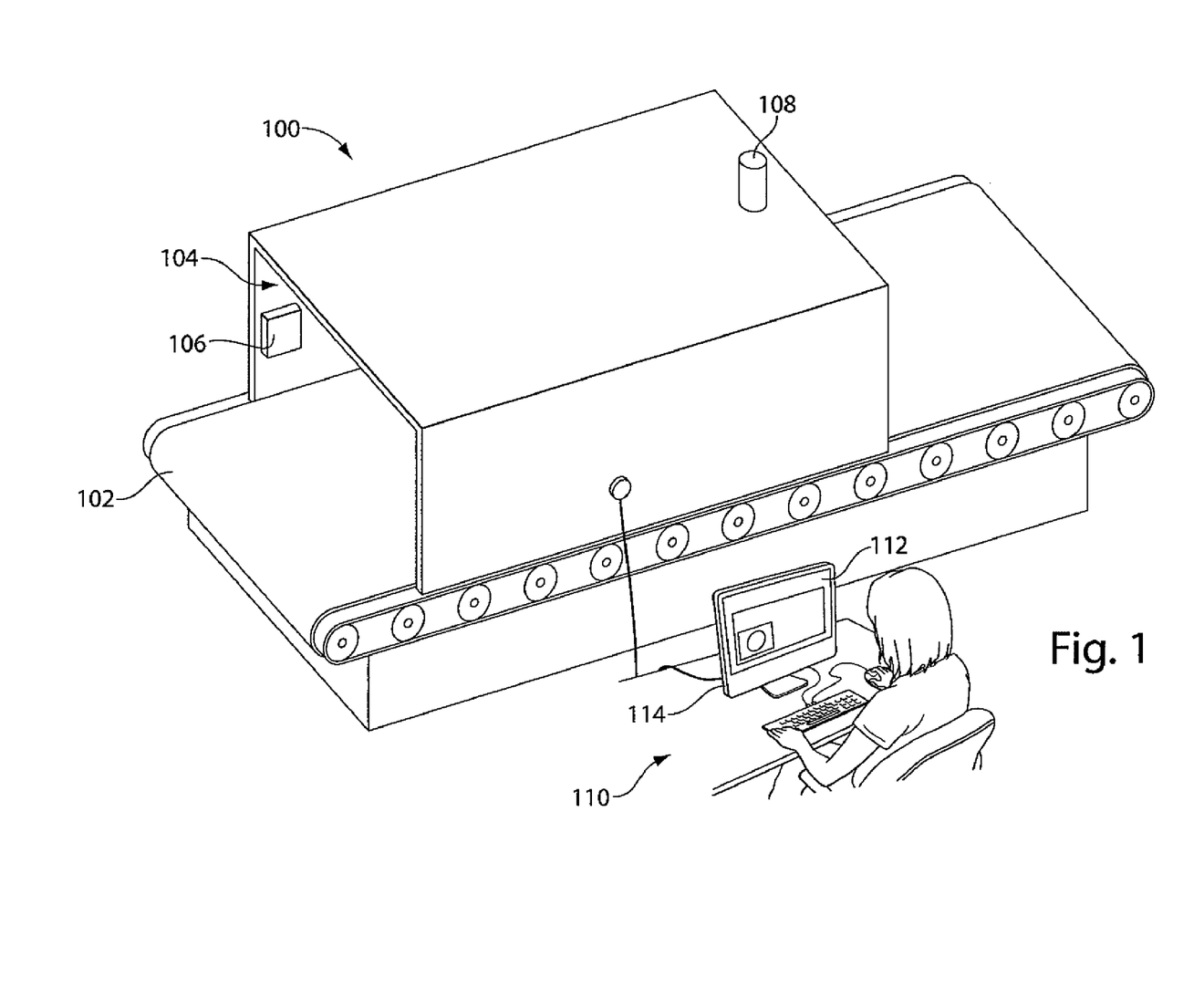
FIG. 1 is a sketch of an inspection system according to some embodiments of the invention.

Inspection of a compartmentalized suitcase may be performed in any suitable inspection system. FIG. 1 illustrates such an inspection system 100. The system includes a belt 102 that is mechanically driven to move items under inspection through a tunnel 104.

System 100 may include one or more x-ray sources and detector arrays within tunnel 104. In some embodiments the x-ray sources and detectors may be stationary, forming a single view projection imaging system or, if multiple sources and detector arrays are present, forming a multi-view inspection system. Alternatively, the sources and/or detector arrays may move within tunnel 104, such as in a computed tomography (CT) system.

Regardless of the specific configuration of x-ray sources and detectors, they may be controlled to acquire an image of an item under inspection as it passes through tunnel 104. That image may be represented in digital form and communicated over a computer network to an inspection station 110. At inspection station 110, the image may be analyzed by a computer, such as computer 114, or may be presented on a display 112 for analysis by a human operator. In some embodiments, the image may be processed first within computer 114 to identify suspicious objects within the image that may be threat objects and then presented to a human operator. In this scenario, the image presented to the human operator on display 112 may include some indication of the suspicious objects.

The mechanical construction of inspection system 100 may be based on techniques as are known in the art. For example, any suitable mechanism for moving a suitcase through an inspection area may be employed, including a control mechanism to determine the rate at which items under inspection are injected into the inspection area and the handling of items under inspection that are either cleared or alarmed as a result of the inspection. Similarly, the imaging system employed by inspection system 100 including sources, detectors and a computer network for conveying collected image data may be constructed using components as are known in the art. Similarly, an image analysis computer 114 may be a conventional image analysis computer.

Though, in some embodiments, the programming for such a computer may be adapted to perform differentiated processing based on compartments in an item under inspection. Other aspects of inspection system 100 may also be adapted for processing of items that contain compartments intended to hold different types of materials. For example, it is described above that a compartmentalized suitcase may contain a tag identifying it as a compartmentalized suitcase. Accordingly, system 100 may include a tag reader.

In the example of FIG. 1 RFID reader 106 is positioned adjacent to tunnel 104 to read RFID tags that may be incorporated into compartmentalized suitcases entering tunnel 104 for inspection. Though, it should be appreciated that other types of tag readers or other mechanism to identify a compartmentalized suitcase may be incorporated in system 100.

As another example of an adaption for differentiated processing, inspection system 100 may be equipped with a probe that is capable of measuring material properties at specific locations in an item under inspection. Such probes are known in the art. For example, a probe operating according to the principles of x-ray scattering may be incorporated into system 100. FIG. 1 shows as an example, x-ray scattering probe 108. Though a control system is not expressly shown in FIG. 1, system 100 may contain a control system that focuses x-ray scattering probe 108 on a specific compartment of an item under inspection as it passes through tunnel 104. Such processing may be used, for example, to make a more accurate assessment of the types of liquids, gels or aerosols contained within a designated compartment of the item under inspection. Though, conversely, the x-ray scattering probe may be focused to collect data on an object that, based on a projection image appears to contain liquid, that is not within the designated compartment.

Figure 2A:
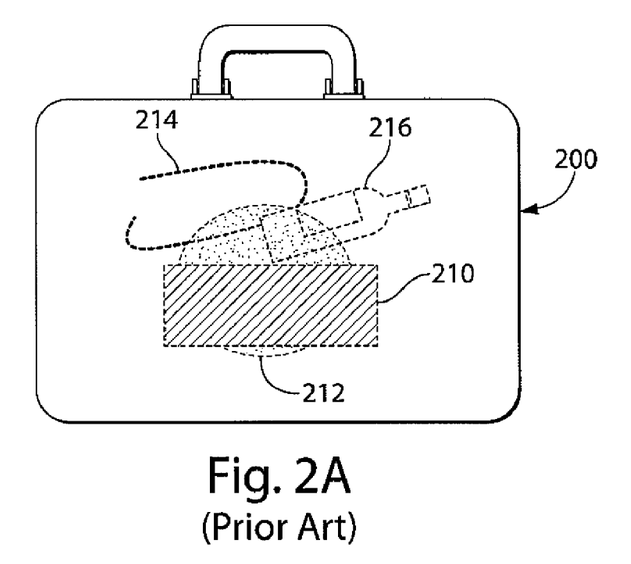
FIG. 2A is a sketch of a projection image of a conventional piece of luggage.
Figure 2B:
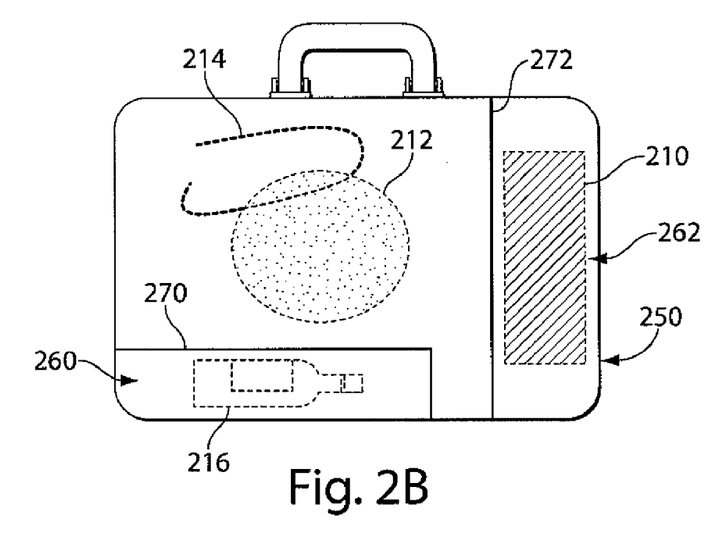
FIG. 2B is a sketch of a projection image of a piece of luggage according to some embodiments of the invention.

FIG. 1 illustrates an inspection system that may be adapted for inspection of compartmentalized luggage. However, it is not a requirement that compartmentalized luggage be inspected in a specially adapted inspection machine. FIGS. 2A and 2B illustrate the manner in which a compartmentalized suitcase may improve inspection, even if differentiated processing on the different compartments is not used. FIG. 2A illustrates a projection image 200 of a conventional piece of luggage. As can be seen in FIG. 2A, objects in the suitcase can appear to overlay one another in a projection image. As a result, objects that are relatively dense or radiopaque tend obscure other objects. For example, in the scenario illustrated in FIG. 2A object 210 may be a metal object. Object 210 overlays object 212. In this scenario, image 200 contains little information about object 212. Analysis of image 200 may reveal that an object is present but insufficient data is available to make an assessment of whether object 212 constitutes a threat. In such a scenario, the analysis of image 200 may generate an alarm because it cannot be determined with sufficient confidence that no threat is present.

As another example of how overlaid objects may o prevent making an assessment with high confidence that an item under inspection does not contain a threat item, image 200 indicates a container 216 of liquid. In the scenario illustrated in FIG. 2A, object 212 overlays container 216. Though object 212 is not dense enough to completely obscure container 216 in the projection image, presence of object 212 may change the measurement of material properties for container 216. The pixels in the image representing the overlaid object 212 and container 216 indicate material properties that are a composite of the properties of object 212 and the material in container 216. As a specific example, the density that can measured from image 200 is between the density of object 212 and the liquid density of in container 216. Because that composite number may depend on the amount of each material present, which is not readily apparent from the projection image 200, it may not be possible to reliably ascertain the density of the liquid in container 216. Similar limitations apply for other material characteristics that may be measured, such as atomic number. Accordingly, when items are overlaid as indicated in FIG. 2A, a reliable determination of the nature of the liquid in container 216 cannot be made. Thus, though image 200 may reveal that a liquid is present in the item under inspection, there may be insufficient data to reliably conclude whether the liquid is a threat, such as gasoline or other combustible liquid, or is an innocuous substance, such as water or soda. Accordingly, the item under inspection may need to be alarmed based on image 200.

FIG. 2B illustrates an image 250 of a suitcase packed with the same items illustrated in FIG. 2A. However, in the scenario illustrated in FIG. 2B, the items have been selectively packed in the suitcase. In this example, the compartments are configured to prevent objects from overlaying one another in a scenario in which a false alarm may have to be generated. As shown in FIG. 2B, the suitcase contains compartments 260 and 262. These compartments are defined, in this scenario by dividers 270 and 272, respectively. In this embodiment, the dividers 270 and 272 are made of or contain strips of radiopaque material such that they are visible in x-ray projection image 250. Though, it is not a requirement of the invention for the dividers to be visible in an x-ray image, and any suitable material may be used to form the dividers. For example, in embodiments in which the dividers are formed of low density foam, there may be no express indication of the dividers in the x-ray image.

Regardless of the material from which dividers 270 and 272 are formed, placing certain types of objects in compartments 260 and 262 allows a threat assessment to be made from image 250 with higher confidence than can be made from image 200. As can be seen, metal object 210 is contained within compartment 262. Compartment 262 is configured such that objects in that compartment do not overlay other objects that may be packed in the suitcase. Accordingly, metal object 210 does not overlay object 212. As a result, object 212 is readily apparent in image 250, and there is a higher likelihood that object 212 may be confidentially identified as an innocuous items.

Similarly, placing container 216 within compartment 260 allows an image of container 216 to be formed without overlaying objects. Analysis of image 250 is therefore more likely to result in a confident determination of the nature of the liquid within container 216. If that determination allows an innocuous liquid such as water or soda to be identified within container 216, image 250 may not trigger an alarm though the same object in image 200 may have necessitated an alarm.

As can be seen in FIG. 2B, other objects may still be packed in a suitcase without specific compartments. For example, objects 212 and 214 are illustrated in image 250. Though these objects may overlay one another, they are not of the type that necessarily leads to an inability to confidentially determine whether there are threat objects in an item under inspection.

Figure 3:
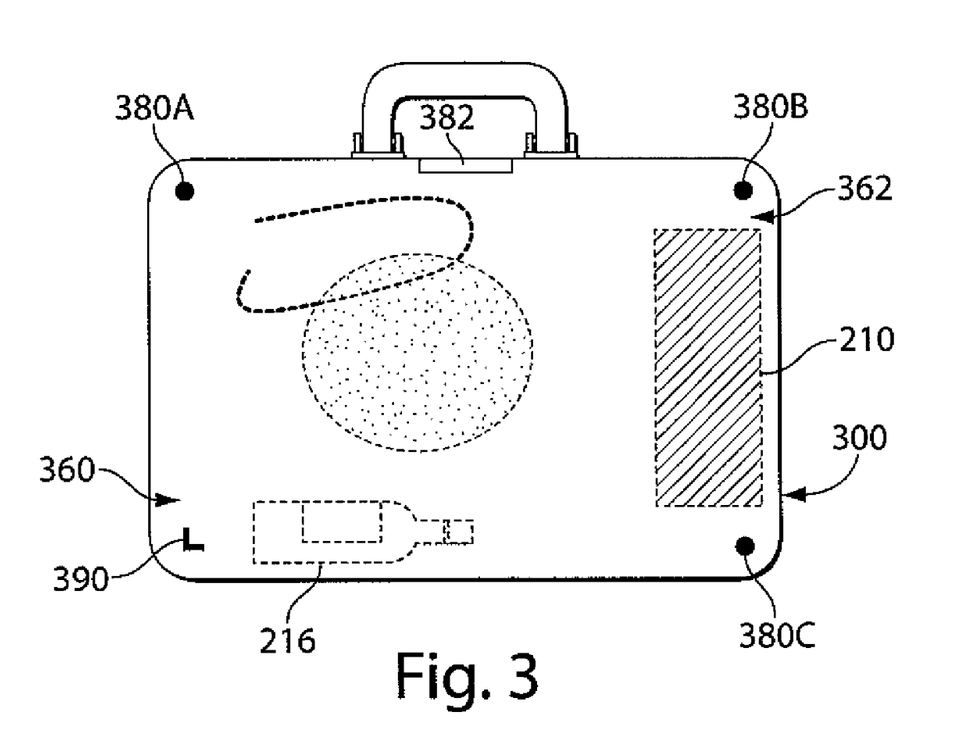
FIG. 3 is a sketch of a projection image of a piece of luggage according to an alternative embodiment of the invention.

FIG. 3 illustrates a projection image of an alternative embodiment of a compartmentalized suitcase. In this example, dividers forming compartments are not visible. Nonetheless, compartments 360 and 362 are present. As in FIG. 2B, a metal object 210 has been packed by a traveler in compartment 362. An object containing liquid 216 has been packed by the traveler in compartment 360. One or more mechanisms may be included to identify that compartments are present. In the example of FIG. 3, the compartmentalized suitcase represented in image 300 may include fiducials or other objects intended to appear in an x-ray image. In this example, the suitcase may include one or more small metal objects such as balls 380A, 380B and 380C. These objects may be positioned to signify that the suitcase contains compartments and/or the configuration of those compartments or the orientation of those compartments relative to the image. This information can be obtained by an inspection system based on analysis of the image to recognize the pattern created by balls 380A, 380B and 380C.

Though, the information my be obtained in other ways. For example, the compartmentalized suitcase may contain an RFID tag 382 that may be read as the suitcase is inspected. For example, FIG. 1 illustrates an RFID reader 106 that may be used to obtain information from each suitcase as it is inspected.

FIG. 3 also illustrates a further approach to obtaining information about a compartmentalized suitcase. In this example, a radiopaque label 390 may be incorporated into one or more compartments. The radiopaque label 390, in this example, may be a pattern indicating that compartment 360 is designated for containing liquids, gels and/or aerosols. Such a designation may be used, for example, by an inspection computer (114, FIG. 1) as it analyzes image 300.

Figure 4:
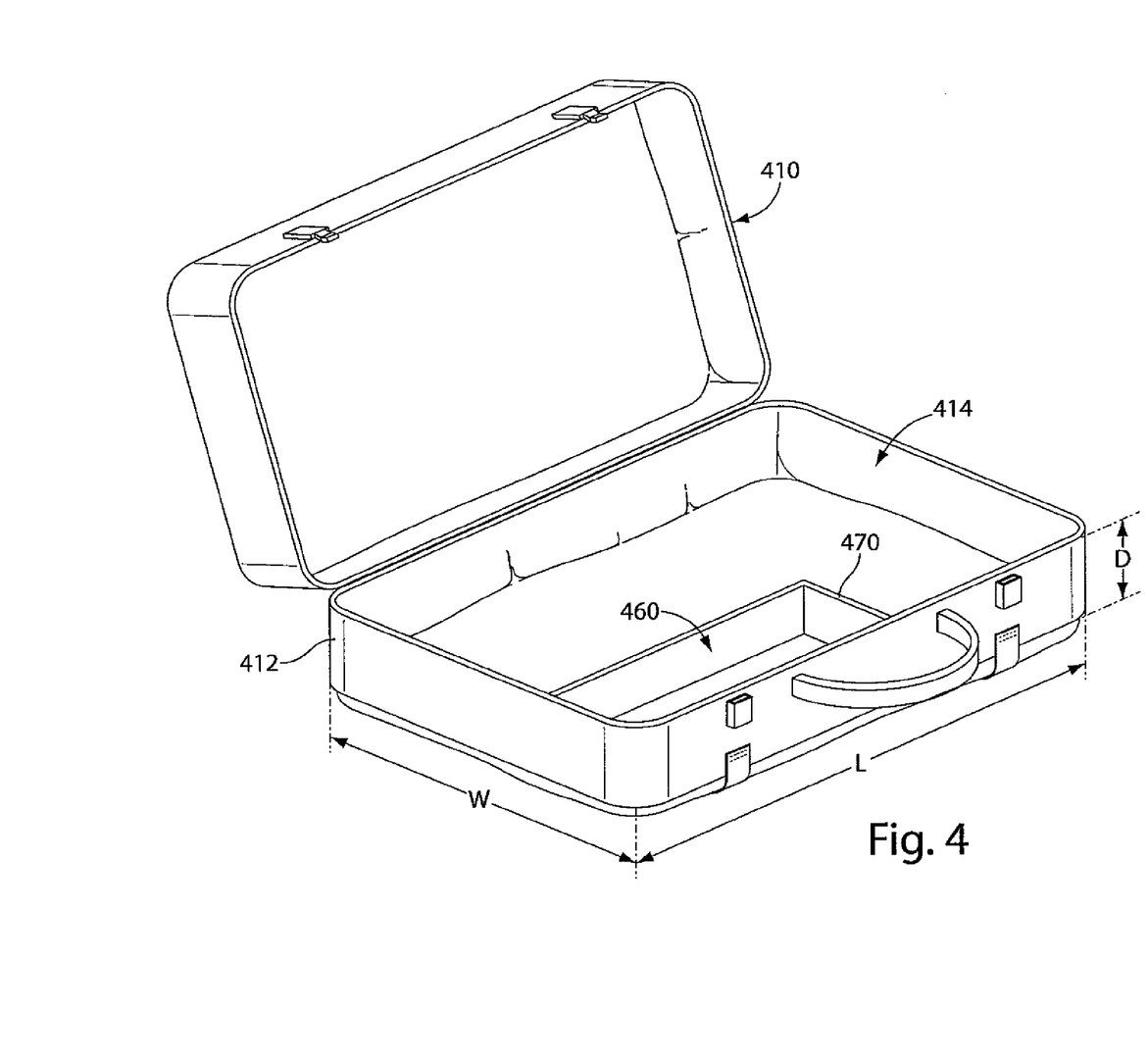
FIG. 4 is a sketch of a piece of luggage according to some embodiments of the invention.

Compartments may be formed in a suitcase or other item of luggage in any suitable way. FIG. 4 illustrates an embodiment of a suitcase 410. Suitcase 410 may be formed with an outer casing 412, which may be a material as is conventionally used in constructing suitcases or any other suitable material. Outer casing 412 defines an inner region 414 where items are intended to be packed in suitcase 410. Compartments may be formed in inner region 414 by inserting dividers or other suitable mechanisms.

The dividers 470 may have any suitable mechanical properties. For example, FIG. 4 illustrates rigid dividers 470. However, it is not a requirement of the invention that the dividers be rigid, and any suitable material capable of defining a compartment, such as compartment 460, may be employed.

As noted above, it may be desirable for compartments to be defined to reduce the likelihood that objects designated to be in those compartments will overlay other objects packed in the suitcase 410. FIG. 4 illustrates one manner in which this configuration can be achieved. As shown, suitcase 410 has a width W, a length L and a depth D. Here, dividers 470 are configured such that compartment 460 extends substantially across the depth of inner region 414. The depth dimension corresponds to the direction in which x-rays are likely to travel through suitcase 410 when it is placed in an inspection machine. This orientation results from the practice of placing items for inspection with their broad dimension defined by the width and length of the object on a belt carrying the object into the inspection machine. The shortest, depth direction, is generally placed perpendicular to the belt. Conventionally, x-ray inspection systems include a source and detector positioned to inspect items at least with x-rays passing generally perpendicular to the belt. In this way, a projection image formed of suitcase 410 will contain a region representing compartment 460 without other objects overlaying it.

Though FIG. 4 shows one divider 470, creating one compartment 460, suitcase 410 may contain any number of dividers defining any suitable number and size of compartments.

Figure 5A:
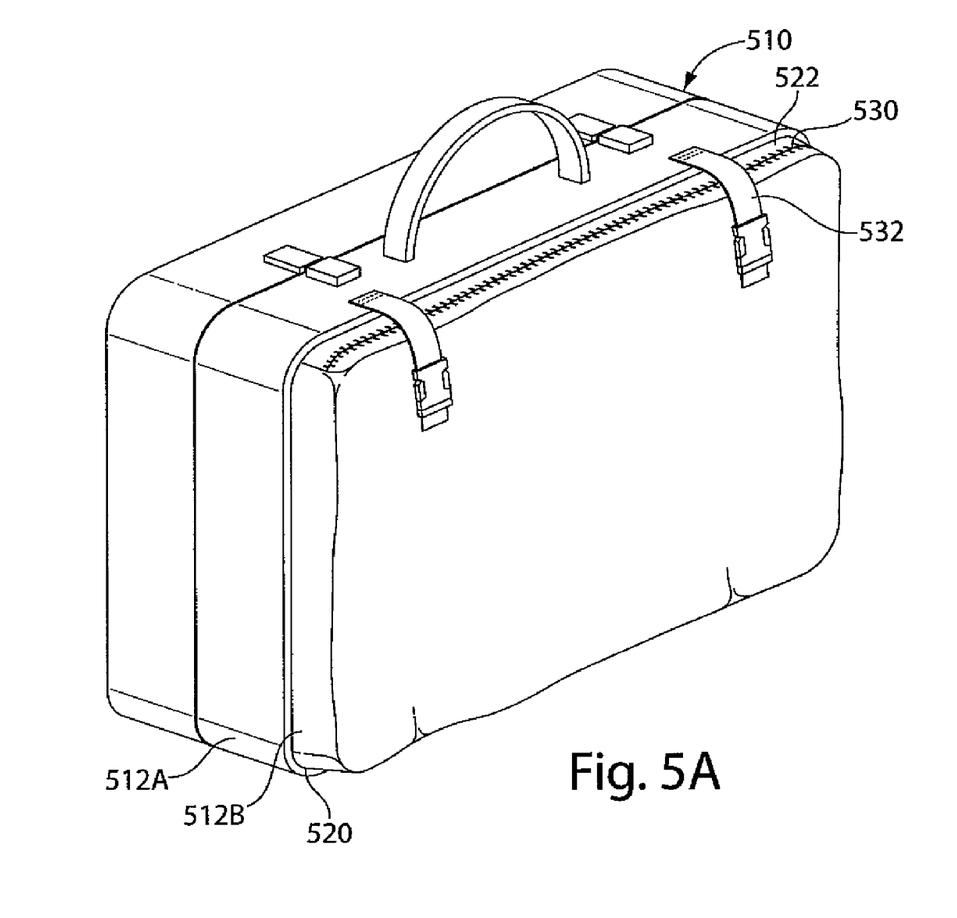
FIG. 5A is a sketch of a piece of luggage according to an alternative embodiment of the invention while in a first configuration.

FIG. 5A illustrates an alternative embodiment of a compartmentalized suitcase. In the embodiment illustrated, suitcase 510 includes two outer casings 512A and 512B. Outer casing 512A may define an inner region (not shown) similar to inner region 414 (FIG. 4). The inner region defined by outer casing 512A may, as illustrated in FIG. 4, contain one or more compartments designated for specific types of materials.

In addition, suitcase 510 may include a second outer casing 512B. In this embodiment, outer casing 512B defines a second inner region sized to receive a laptop or other portable electronic devices. As shown, outer casing 512B has a lower edge 520 and opposing upper edge 522. Upper edge 522 is designed with an opening, allowing a laptop or other objects to be inserted into the inner region defined by outer casing 512B.

The opening along edge 522 may be sealable with some closing mechanism. In the embodiment illustrated, upper edge 522 contains a zipper 530 as a closing mechanism. Though, buttons, snaps, straps or other closing mechanisms may be used alternatively or additionally. In this way, an opening may be formed along edge 522 to allow insertion of a laptop computer or other electronic item. The opening can then be sealed to retain the laptop in the inner region defined by casing 512B.

FIG. 5A illustrates an embodiment in which an opening may be formed along an upper edge 522. However, it should be appreciated that any suitable opening at any suitable location may be formed. For example, an opening may be formed in either edge perpendicular to upper edge 522.

Figure 5B:
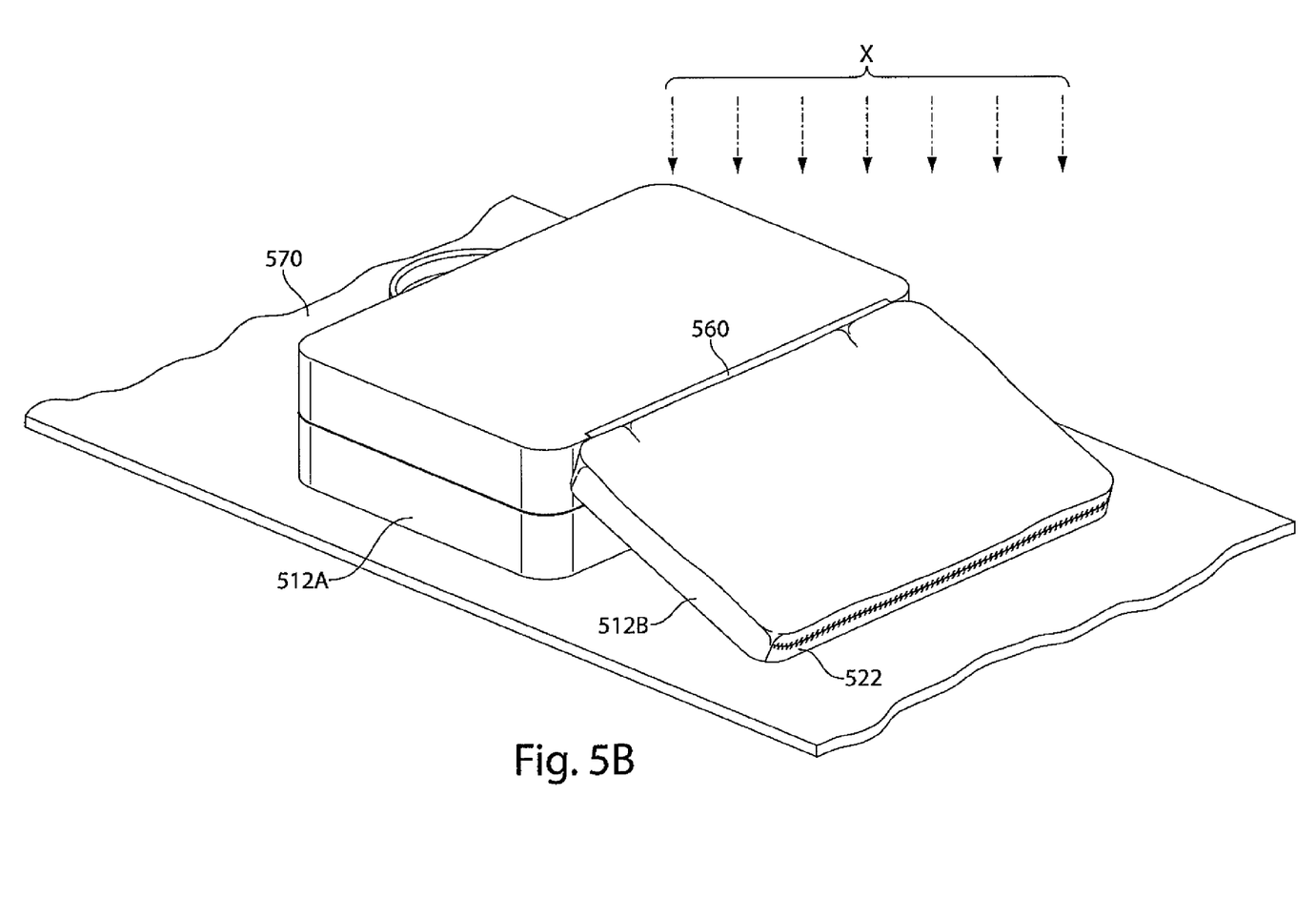
FIG. 5B is a sketch of the piece of luggage of FIG. 5A placed in a second configuration for inspection.

In the configuration illustrated in FIG. 5A, a laptop computer or other item inserted into the inner region defined by outer casing 512B has the potential for overlaying objects within the inner region defined by 512A. Accordingly, suitcase 510 is adapted to have at least two configurations, one for carrying items and one for presenting suitcase 510 for x-ray inspection. In the embodiment illustrated, outer casing 512B is adapted to facilitate easy reconfiguration of suitcase 510. FIG. 5B illustrates suitcase 510 placed in a second configuration for inspection. As shown in FIG. 5B, suitcase 510 is placed on a belt 570, which may carry suitcase 510 through an inspection system. As shown, the system may be designed to image suitcase 510 with x-rays traveling in the direction labeled X.

In the configuration shown in FIG. 5B the compartment defined by outer casing 512B has been partially separated from outer casing 512A. In particular, rather than overlaying the inner region defined by outer casing 512A as in the configuration of FIG. 5A, in the configuration of FIG. 5B the compartment within outer casing 512B is beside the inner region defined by casing 512A. The objects to be imaged inside suitcase 510 are thus substantially in the same plane defined by belt 570. This plane is perpendicular to the direction in which x-rays pass through suitcase 510 for inspection. Thus, objects within the compartment defined by outer casing 512B do not overlay any objects within the inner region defined by outer casing 512A. If, for example, the compartment defined by outer casing 512B contains a laptop, that laptop may be imaged without overlaying objects, which increases the likelihood that an assessment can be made reliably on whether the laptop contains a threat object.

Suitcase 510 is shown to contain features that facilitate easy reconfiguration from the configuration of FIG. 5A to the configuration of FIG. 5B. For example, outer casing 512B is shown to be joined to outer casing 512A with a hinge mechanism. In this case, the hinge mechanism 560 is positioned along lower edge 520. In the embodiment illustrated, outer casing 512B is a durable, but flexible membrane. Hinge mechanism 560 may be formed by sewing or otherwise attaching a portion of this membrane to outer casing 512A. Though, it should be appreciated that the location at which outer casing 512B is attached to outer casing 512A and the mechanism by which this attachment is formed are not critical to the invention. Also, the mechanism by which outer casing 512B is held in the position illustrated in FIG. 5A is not critical to the invention. In this example, straps 532 are shown holding outer casing 512B in the desired position. However, other mechanisms, such as snaps, zippers or hooks may be used.

Having thus described several aspects of at least one embodiment of this invention, it is to be appreciated that various alterations, modifications, and improvements will readily occur to those skilled in the art.

It should be appreciated that the compartmentalized suitcase is not limited to any size, name, or brand. The compartmentalized suitcase is illustrative of an apparatus used to transport items including and not limited to hand bags, suitcases, baggage, and back packs or other containers that could be used a luggage.

As described above a suitcase/bag according to embodiments of the invention may provide a faster and easier way of inspecting baggage at security checkpoints. The suitcase can be compartmentalized with each compartment assigned to be populated by a particular group of objects. (For example, a suitcase may be compartmentalized in four sections. Section 1 may contain liquids and gels, section 2 may contain metallic items, section 3 may contain clothes, and section 4 may contain shoes.) Such suitcases can be built in several dimensions, shapes, and sizes with different materials. The compartments within the suitcase can be designed for different shapes, sizes, and dimensions. Different styles may be provided for different uses. (For example, one can have a compartmentalized suitcase for carrying mainly sports goods which would require larger compartments, or for carrying medical devices which would require smaller more compact compartments.)

Each suitcase may have its dimensions, compartments, and material composition details encoded in a tag, which could provide information to the X-ray scanning machine upon inspection.

Furthermore, the compartmentalized suitcase may be attached with additional fittings and accessories such as straps, pockets, and handles.

Those skilled in the art will appreciate that the X-ray screening system may be part of a general purpose or special purpose computing system environment or configuration. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like. The invention may also be practiced in distributed computing environments where tasks are performed by remote processing devices that are linked through a communications network. In a distributed computing environment, program modules may be located in both local and remote memory storage devices.

Such alterations, modifications, and improvements are intended to be part of this disclosure, and are intended to be within the spirit and scope of the invention. Accordingly, the foregoing description is by way of example only.

The above-described embodiments of the present invention can be implemented in any of numerous ways. For example, embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. Any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A method of facilitating security screening for luggage, the method comprising:
   selectively packing metal items in a piece of luggage comprising a plurality of compartments, the metal items being packed in a first of the plurality of compartments, the first compartment being designated for containing metal items in accordance with a predefined format;
   selectively packing items containing liquids or gels in a second of the plurality of compartments, the second compartment being designated for containing liquids or gels in accordance with the predefined format; and
   presenting the selectively packed piece of luggage for x-ray inspection in conjunction with an indication that the piece of luggage has been packed in accordance with the predefined format.

2. The method of claim 1, further comprising:
   selectively packing a laptop in a third of a plurality of compartments.

3. The method of claim 2, further comprising:
   selectively packing items containing aerosol in the second of the plurality of compartments.

4. The method of claim 2, wherein:
   presenting the piece of luggage for x-ray inspection comprises reconfiguring the piece of luggage from a first configuration into a second configuration,
   in the first configuration, the first and second compartments are disposed within a first plane and the third of the plurality of compartments are disposed in a second plane, parallel to the first plane, such that the third of the plurality of compartments overlays the first and second of the plurality of compartments, and
   in the second configuration, the first compartment, the second compartment and the third compartment are disposed substantially in the same plane.

5. The method of claim 4, wherein presenting the piece of luggage for x-ray inspection further comprises:
   placing the piece of luggage on a belt of an x-ray inspection machine in the second configuration.

6. The method of claim 1, further comprising:
   inspecting the piece of luggage with an x-ray inspection device, the inspecting comprising:
   forming an x-ray image of the piece of luggage; and
   making a threat assessment of the piece of luggage based on the x-ray image, the making comprising:
      identifying a region of the image associated with the second of the plurality of compartments; and
      selectively processing the identified region in accordance with an algorithm to assess the nature of a liquid or gel.

7. The method of claim 1, wherein presenting the piece of luggage for inspection comprises:
   presenting an indicator that the piece of luggage is owned by a pre-certified traveler.

8. Luggage adapted for security inspection, the luggage comprising:
   an outer casing enclosing an inner region adapted for holding a plurality of objects;
   a plurality of dividers within the inner region, the plurality of dividers positioned to define a plurality of compartments hidden from view by the casing; and
   an indicator indicating that the plurality of compartments comprise a predefined configuration, the indicator comprising a radio-opaque member,
   wherein a first of the plurality of compartments is designated to contain metal objects and a second of the plurality of compartments is designated to contain liquids and/or gels in accordance with the predefined configuration.

9. The luggage of claim 8, wherein the plurality of compartments are disposed in the same plane.

10. The luggage of claim 8, wherein the second of the plurality of compartments is designated to contain liquids, gels and aerosols in accordance with the predefined configuration.

11. The luggage of claim 8, wherein:
    the outer casing is a first outer casing and the inner region is a first inner region; and
    the luggage comprises a second outer casing enclosing a second inner region, the second outer casing having a first edge and a second edge opposite the first edge, the first edge comprising a sealable opening and the second edge comprising a hinge mechanism, pivotably joining the second outer casing to the first outer casing.

12. The luggage of claim 11, wherein the second inner region is sized to receive a laptop computer.

13. The luggage of claim 12, wherein the second outer casing comprises a zipper along the first edge, wherein the zipper comprises a sealing mechanism for the sealable opening.

14. The luggage of claim 12, wherein the radio-opaque mechanism comprises radio-opaque objects in a predefined pattern indicative of luggage with a government approved configuration.

15. The luggage of claim 8, wherein the inner region has a length, a width and a depth and the first and second of the plurality of compartments each extends fully across the depth.

16. The luggage of claim 8, wherein the radio-opaque mechanism comprises a plurality of radio-opaque objects embedded in the outer casing in positions that produce a pattern in an x-ray image of the luggage identifying the luggage as having the predefined configuration of compartments.

17. Luggage adapted for security inspection, the luggage comprising:
    an outer casing enclosing an inner region adapted for holding a plurality of objects;
    a plurality of dividers within the inner region, the plurality of dividers positioned to define a plurality of compartments hidden from view by the casing; and
    an RFID tag embedded in the luggage and programmed to produce an RF signal with a pattern identifying the luggage as having a predefined configuration of compartments,
    wherein a first of the plurality of compartments is designated to contain metal objects and a second of the plurality of compartments is designated to contain liquids and/or gels in accordance with the predefined configuration.

18. A system for inspecting luggage, the system comprising:
    an imaging unit adapted to produce an image of the contents of a piece of luggage under inspection;
    a processor; and
    computer storage medium comprising computer executable instructions that, when executed by the processor, perform a method comprising:
    acquiring an image of the piece of luggage under inspection;

determining whether the piece of luggage under inspection has at least one compartment adapted to hold items of a predefined type;

selectively analyzing the image in response to the determining, the selectively analyzing comprising:

when the piece of luggage under inspection is not determined to have the at least one compartment, analyzing the image in accordance with a first algorithm;

when the piece of luggage under inspection is determined to have the at least one compartment, analyzing the image in accordance with a second algorithm, different than the first algorithm.

19. The system of claim 18, wherein:

the system further comprises an RFID reader positioned to read an RFID tag in the piece of luggage under inspection; and determining whether the piece of luggage under inspection has the at least one compartment comprises analyzing a value read with the RFID reader.

20. The system of claim 18, wherein analyzing the image in accordance with the second algorithm comprises:

locating a region in the image representing a compartment of the at least one compartment;

ascertaining a density of items in the compartment;

indicating a potential threat object in the region when the density is within a range of densities associated with explosive liquid or gels;

not indicating a potential threat object in the region when the density is within a range of densities associated with personal-use liquids, gels and aerosols.

21. The system of claim 18, wherein the system further comprises a probe adapted to be focused on a selected location and obtain information on the atomic number of an item in the selected location; and the second algorithm comprises focusing the probe on a compartment of the at least one compartment.

* * * * *